US012781793B2

(12) United States Patent
Hauvespre et al.

(10) Patent No.: US 12,781,793 B2
(45) Date of Patent: Nov. 3, 2026

(54) OPTIMIZED BALL BEARING WITH FEATURES FOR MASS REDUCTION AND IMPROVED LUBRICATION

(71) Applicant: AKTIEBOLAGET SKF, Gothenburg (SE)

(72) Inventors: Benoît Hauvespre, Saint Etienne de Chigny (FR); Samuel Viault, Saint-Antoine-du-Rocher (FR); Davide Umberto Marcomini, Druento (IT); Tom Schmitz, Hambach (DE)

(73) Assignee: AKTIEBOLAGET SKF, Gothenburg (SE)

( * ) Notice: Subject to any disclaimer, the term of this patent is extended or adjusted under 35 U.S.C. 154(b) by 128 days.

(21) Appl. No.: 18/924,386

(22) Filed: Oct. 23, 2024

(65) Prior Publication Data

US 2025/0137485 A1 May 1, 2025

(30) Foreign Application Priority Data

Oct. 31, 2023 (IT) ........................ 102023000022914

(51) Int. Cl.
*F16C 19/06* (2006.01)
*F16C 33/30* (2006.01)
(Continued)

(52) U.S. Cl.
CPC ............ *F16C 19/06* (2013.01); *F16C 33/303* (2013.01); *F16C 33/32* (2013.01); *F16C 33/41* (2013.01);
(Continued)

(58) Field of Classification Search
CPC ........ F16C 19/06; F16C 33/41; F16C 33/412; F16C 33/414; F16C 33/416;
(Continued)

(56) References Cited

U.S. PATENT DOCUMENTS 7,384,197 B2 6/2008 Plona
2003/0086629 A1 * 5/2003 Yatabe .................... F16C 33/58 384/450
(Continued)

FOREIGN PATENT DOCUMENTS

JP 2579164 B2 * 2/1997 .............. F16C 19/06
JP 2004176785 A * 6/2004 .......... F16C 33/6633
(Continued)

OTHER PUBLICATIONS

Written Opinion and Search Report from the Italian Patent Office mailed May 14, 2024 in related application No. IT 102023000022914, and translation of Written Opinion and partial translation of Search Report.

*Primary Examiner* — Phillip A Johnson
(74) *Attorney, Agent, or Firm* — J-TEK LAW PLLC; Scott T. Wakeman; Mark A. Ussai

(57) ABSTRACT

An optimized ball bearing for an electric vehicle having an inner ring or an outer ring with a radial thickness at least equal to the diameter of the balls is provided with at least one annular recessed surface to reduce the mass of the ring. Each annular recessed surface may be formed as chamfer, a fillet or a groove. The annular recessed surfaces may be provided on both the inner and outer rings to improve lubrication flow.

17 Claims, 10 Drawing Sheets

(51) Int. Cl.

| | |
|---|---|
| ***F16C 33/32*** | (2006.01) |
| ***F16C 33/41*** | (2006.01) |
| ***F16C 33/58*** | (2006.01) |
| ***F16C 33/66*** | (2006.01) |

(52) U.S. Cl.

CPC ........ *F16C 33/583* (2013.01); *F16C 33/6659* (2013.01); *F16C 2206/40* (2013.01); *F16C 2240/40* (2013.01); *F16C 2240/70* (2013.01); *F16C 2240/80* (2013.01); *F16C 2380/26* (2013.01)

(58) Field of Classification Search

CPC .......... F16C 33/583586; F16C 33/6659; F16C 33/6677; F16C 2206/40; F16C 2240/70; F16C 2240/80; F16C 2380/26

See application file for complete search history.

(56) References Cited

U.S. PATENT DOCUMENTS

| | | | | |
|---|---|---|---|---|
| 2009/0131235 | A1 | 5/2009 | Katsuno et al. | |
| 2024/0110595 | A1* | 4/2024 | Watabe | F16C 19/06 |

FOREIGN PATENT DOCUMENTS

| | | | | |
|---|---|---|---|---|
| JP | 2006336827 | A | * 12/2006 | F16C 33/58 |
| JP | 2007177858 | A | 7/2007 | |
| JP | 4015360 | B2 | * 11/2007 | F16C 33/7853 |
| JP | 2012141064 | A | 7/2012 | |
| JP | 2012167814 | A | 9/2012 | |

* cited by examiner

OPTIMIZED BALL BEARING WITH FEATURES FOR MASS REDUCTION AND IMPROVED LUBRICATION

CROSS-REFERENCE

This application claims priority to Italian patent application no. 102023000022914 filed on Oct. 31, 2023, the contents of which are fully incorporated herein by reference.

BACKGROUND OF THE INVENTION

The present invention relates to bearings, and more particularly to ball bearings.

Ball bearings are well known and include at least an inner ring with an inner raceway, an outer ring with an outer raceway and a plurality of balls disposed between the two rings and rolling simultaneously upon the inner and outer raceways. The selection of a ball bearing for a particular application is generally based upon providing a shaft diameter onto which the bearing is installed and an amount of loading to be supported by the bearing. Then, an appropriate bearing size is selected from among one of typically several commercially available ball bearings which are capable of fitting on the designated shaft size and supporting the indicated load.

Although such a ball bearing selection process has proven quite effective since the inception of the ball bearing industry, this process often results in the utilization of a bearing that is larger and heavier than is actually required to support the designated load. Particularly with applications such as electric vehicles, there is a motivation to reduce size and weight of various mechanical components in order to reduce energy consumption.

SUMMARY OF THE INVENTION

In one aspect, the present invention is a ball bearing for an electric vehicle, the ball bearing supporting a load applied to a shaft of an electric motor of the vehicle and rotatably coupling the shaft with a housing. The ball bearing comprises an inner ring having a centerline, an inner circumferential surface sized to fit upon the shaft of the electric motor, an outer circumferential surface, a radial thickness defined between the inner and outer circumferential surfaces, a first axial end, an opposing second axial end, and an inner raceway formed in the outer circumferential surface. An outer ring is disposed about the inner ring and has an outer circumferential surface, an inner circumferential surface, a radial thickness defined between the inner and outer circumferential surfaces, a first axial end, an opposing second axial end and an outer raceway formed in the inner circumferential surface. A plurality of balls are disposed between the inner raceway and the outer raceway, each ball having a ball diameter. If a ratio between the radial thickness of the inner ring and the ball diameter is at least 1.0, the inner ring includes at least one annular recessed surface formed between the outer circumferential surface and the first axial end and/or a formed between the outer circumferential surface and the second axial end. Alternatively, if a ratio between the radial thickness of the outer ring and the ball diameter is at least 1.0, the outer ring includes at least one annular recessed surface formed between the inner circumferential surface and the first axial end and/or a formed between the inner circumferential surface and the second axial end.

Further, the plurality of balls traverse a pitch circle extending about the centerline, the pitch circle having a pitch diameter. The specific number of the plurality of balls and the ball diameter are selected to provide a value of the pitch diameter which satisfies the following equations:

$$X = \pi^2 * BD^2 * PD * ID;\ \text{where } LL \le X \le UL;$$

$$UL = (-2.4815 * ID^3) + (211.6 * ID^2) - (4568.1 * ID) + 38956;\ \text{and}$$

$$LL = (-23.51 * ID^2) + (2235.9 * ID) - 2856;$$

wherein X is a suitability factor, BD is the ball diameter, PD is the pitch diameter, ID is the inside diameter of the inner ring, LL is a lower limit and UL is an upper limit, thereby providing an optimized ball bearing.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 5:
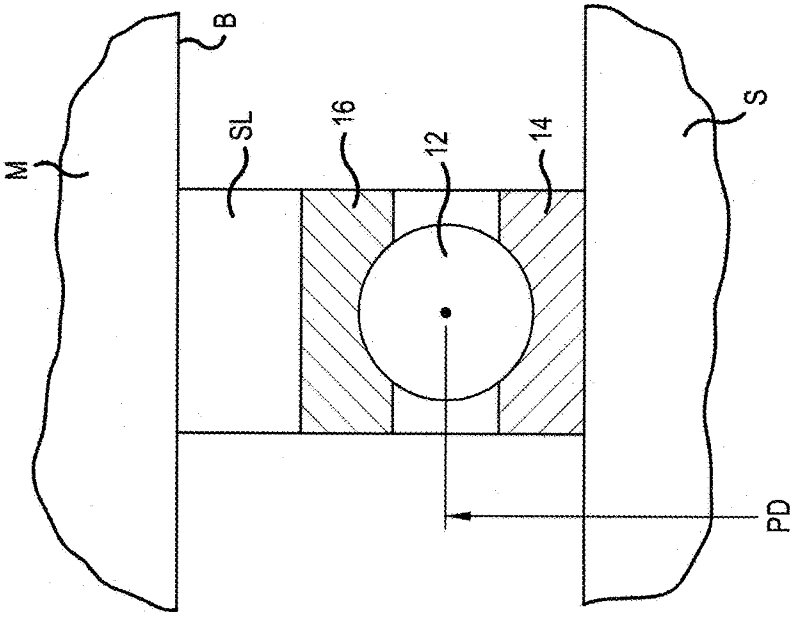
FIG. 5 is an axial cross-sectional view of an optimized ball bearing, showing an adapter sleeve for fitting the bearing within a conventionally sized bore of a housing.
Figure 4:
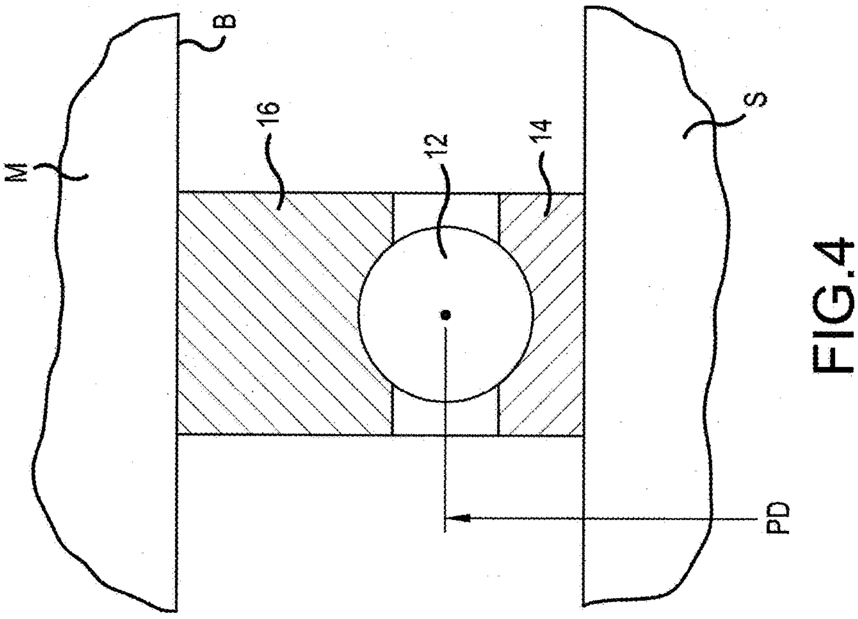
FIG. 4 is an axial cross-sectional view of an alternative optimized ball bearing, showing an outer ring sized to fit within a conventionally sized bore of a housing.
Figure 6:
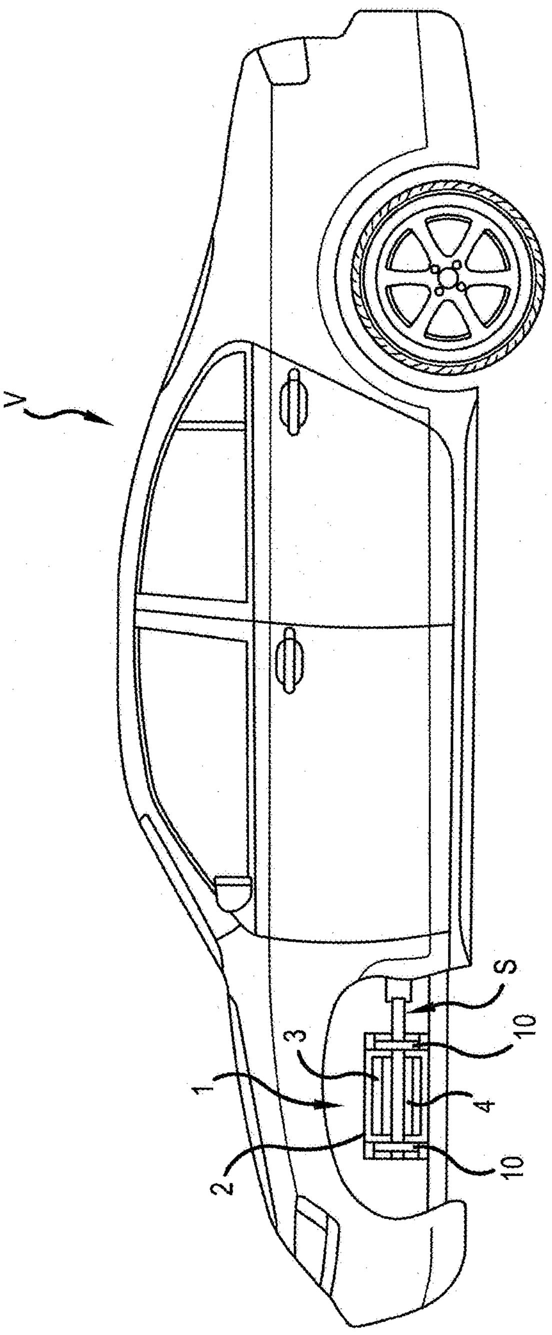
FIG. 6 is partly broken-away, more diagrammatic view of an electric vehicle and an electric motor incorporating the bearing of the present invention.

Referring now to the drawings in detail, wherein like numbers are used to indicate like elements throughout, there is shown in FIGS. 1-14 a ball bearing 10 for supporting a load L applied to a shaft S. The load L has a predetermined value and may be radial, axial, a moment or any combination thereof and the shaft S has an outside diameter ODs. The bearing 10 is preferably for an electric vehicle V, specifically for supporting a load L applied to an output shaft S of an electric motor 1 of the vehicle V, the shaft S being rotatable about a central axis $A_C$. More specifically, the ball bearing 10 is preferably disposed within a housing 2 which encloses an electric motor stator 3 disposed about an electric motor rotor 4 mounted on the shaft S, with two of the bearings 10 each located adjacent to a separate axial end of the rotor 4, as shown in FIG. 6. The ball bearing 10 is formed in accordance with a method of the present invention, as described in detail below, in which the bearing 10 has been designed to optimize the use of materials of the bearing 10, in particular the number and size of the plurality of balls 12 required to support the load L and positioning the balls 12 on a pitch circle PC which is typically "smaller", i.e., having a lesser value of the pitch diameter PD, in comparison with prior art design principles. Specifically, the ball bearing 10 is formed having a selected inner ring inside diameter ID, a determined number N of the balls 12 of a specific diameter BD so as to provide an optimized pitch diameter PD which satisfies the following equations:

$$X = \pi^2 * BD^2 * PD * ID;\ \text{where } LL \le X \le UL;$$

$$UL = (-2.4815 * ID^3) + (211.6 * ID^2) - (4568.1 * ID) + 38956;\ \text{and}$$

$$LL = (-23.511 * ID^2) + (2235.9 * ID) - 2856;$$

wherein X is a suitability factor, LL is a lower limit and UL is an upper limit, as described in further detail below. Also, as used throughout the present disclosure, the symbol "*" is intended to indicate a multiplication operation.

Basically, the ball bearing 10 comprises an inner ring 14 and an outer ring 16 disposed about the inner ring 14 and an optimized number N of the balls 12, which are preferably retained within a cage 13 as described below. Specifically, the inner ring 14 has a centerline CL (FIG. 2), which is coaxial with the shaft axis $A_C$, an inner circumferential surface 15A with an inside diameter ID, an opposing outer circumferential surface 15B with an outside diameter (not indicated), a first axial end 14*a*, and an opposing second axial end 14*b*. An inner raceway 18 extends inwardly from the outer surface 15B and has an inner track diameter $TD_I$ at a central position on the inner raceway 18, the inner raceway 18 preferably being centered between the axial ends 14*a*, 14*b* of the inner ring 14. Also, the inner ring 14 has an axial length $LA_I$ between the first and second axial ends 14*a*, 14*b* and a radial thickness $TR_I$ defined between the inner and outer circumferential surfaces 15B, 15A. Preferably, the inside diameter ID is sized approximately equal to the designated outside diameter ODS of the shaft S, but is most preferably reduced by a desired amount of interference between the inner ring 14 and the shaft S.

Further, the outer ring 16 has an outer circumferential surface 17A with an outside diameter OD, an inner circumferential surface 17B with an inside diameter (not indicated), a first axial end 16*a*, and an opposing second axial end 16*b*. An outer raceway 20 extends outwardly from the inner surface 17B and has an outer track diameter $TD_O$ at a central position on the outer raceway 20, the outer raceway 20 preferably being centered between the axial ends 16*a*, 16*b* of the outer ring 16. Also, the outer ring 16 has an axial length $LA_O$ between the first and second axial ends 16*a*, 16*b* and a radial thickness $TR_O$ defined between the inner and outer circumferential surfaces 17B, 17A.

In the preferred application of an electric vehicle V, the balls 12 are preferably fabricated of a ceramic material, but may be made any other appropriate material for other applications, such as bearing steel, etc. The number N of balls 12 is determined or calculated to provide only the amount/number of balls 12 required to support the specified load L, with a factor of safety (i.e., the balls 12 will support loads exceeding the specified load L by a certain amount to avoid failure). As such, the bearing 10 is designed with a minimal acceptable number N of the balls 12 that will both provide the required load L support and enable other dimensions of the bearing 10 to be sufficiently sized to provide the required strength and structural integrity of the ball bearing 10.

More specifically, the balls 12 have a specific ball diameter BD and are preferably selected from among a plurality of standard ball sizes, each standard ball size having a ball diameter with a value different than the value of the ball diameter of each other standard ball size. Each ball 12 of a particular standard size is known to have a certain "load capacity" or the capability of safely supporting up to a certain amount of loading. Also, a larger ball formed of a given material (e.g., bearing steel, ceramic, etc.) has the capacity to support a greater load than a smaller ball formed of the same material, and vice-versa. However, the balls 12 may alternatively be specifically manufactured for the bearing 10 and may each have a non-standard ball diameter BD.

In either case, once a particular ball size with a specified ball diameter BD has been selected, the number N of the balls 12 required to support the specified load L may be determined by dividing the load L by the load capacity of each ball 12 of the selected ball size. That is:

Number of balls(*N*)=Load(*L*)/Ball Load Capacity

Once the number N of the balls 12 is calculated or determined, the circumference of the pitch circle PC, the theoretical circle extending through the center of each ball 12 as the balls 12 circulate between the inner ring 14 and the outer ring 16, may be determined. Specifically, the circumference CP of the pitch circle PC is calculated by multiplying the determined number N of the balls 12 by the ball diameter BD, or:

$$CP=N*BD$$

As there is typically a desired spacing distance SD between each pair of two adjacent balls 12, which is typically established or maintained by a ball cage (not shown), the circumference CP of the pitch circle PC spacing may be more accurately calculated as follows:

$$CP=(N*BD)+(N*SD)$$

Next, having determined the circumference CP of the pitch circle PC, the diameter of the pitch circle or the "pitch diameter" PD may be calculated by dividing the calculated value of the circumference CP of the pitch circle PC by the value of the mathematical constant of pi or "π" (i.e., 3.1459265 . . . ), as is known in basic geometrical principles. The calculation of the pitch diameter may be expressed by the following equation:

$$PD=CP/\pi=(N*BD)/\pi$$

or, accounting for the spacing distance SD between the balls 12, the pitch diameter PD may instead be calculated as follows:

$$PD=CP/\pi=[(N*BD)+(N*SD)]/\pi$$

Once the pitch diameter PD for the required number N of the balls 12 of the selected ball size is known, the appropriateness or "suitability" of a specific value of the pitch diameter PD is determined by calculating a "suitability factor" X for the calculated pitch diameter PD based on the selected ball size (i.e., ball diameter BD) and the determined inside diameter ID of the inner ring 14. The suitability factor X has been determined to account for various factors of bearing design, such as a minimal required radial thickness of the inner ring 14 between the inner raceway 18 and the inner circumferential surface 15A for a particular inner ring inside diameter ID, a minimum axial length $LA_I$ of the inner ring 14 for a particular ball diameter BD and inner ring inside diameter ID, etc. Utilizing these and other factors, a detailed discussion of which is beyond the scope of the present disclosure, the suitability factor X is expressed by the following equation:

$$X=\pi^2*BD^2*PD*ID$$

Further, a particular value of the pitch diameter PD, calculated or derived as discussed above, has been determined to be acceptable or "validated" when the value of the suitability factor X is between an upper limit UL and a lower limit LL which are calculated as follows:

$$UL=(-2.4815*ID^3)+(211.6*ID^2)-(4568.1*ID)+38956;\ \text{and}$$

$$LL=(-23.511*ID^2)+(2235.9*ID)-28567.$$

As such, when a particular value of the pitch diameter PD, which is based upon a selected ball size, i.e., the ball diameter BD, is validated or found to be acceptable using the suitability factor X, the remaining dimensions of the ball bearing 10 may be designed or devised based upon an available envelope or space for the bearing 10 between the shaft S and an outer member M (e.g., a housing, a hub, etc.) and other conventional bearing design factors. Such dimensions include values for the inside track diameter $TD_I$, the outside track diameter $TD_O$, the axial length $LA_I$, $LA_O$ of the inner and outer rings 14, 16, the outside diameter OD of the outer ring 16, etc. In any case, at least one ball bearing 10 having the validated pitch diameter PD, the selected ball diameter BD and the determined number N of the balls 12, and the other calculated bearing dimensions discussed above and in further detail below, is preferably manufactured.

More specifically, the inner track diameter $TD_I$ of the inner raceway 18 of the inner ring 14 is calculated by subtracting the specific ball diameter BD from the pitch diameter PD. Similarly, the outer track diameter $TD_I$ of the outer raceway 20 of the outer ring 16 may be calculated by adding the specific ball diameter BD from the pitch diameter PD. Also, the axial length $LA_I$ of the inner ring 14 may be calculated as the sum of the ball diameter BD and twice a value of a desired shoulder axial length (not indicated) and the axial length $LA_O$ of the outer ring 16 is calculated as the sum of the ball diameter BD and twice a value of a desired shoulder axial length (not indicated). Preferably, the axial lengths of the inner and outer rings 14, 16 are equal, so as to provide a common bearing axial length SLB, but may alternatively differ from each other in certain applications.

Figure 1:
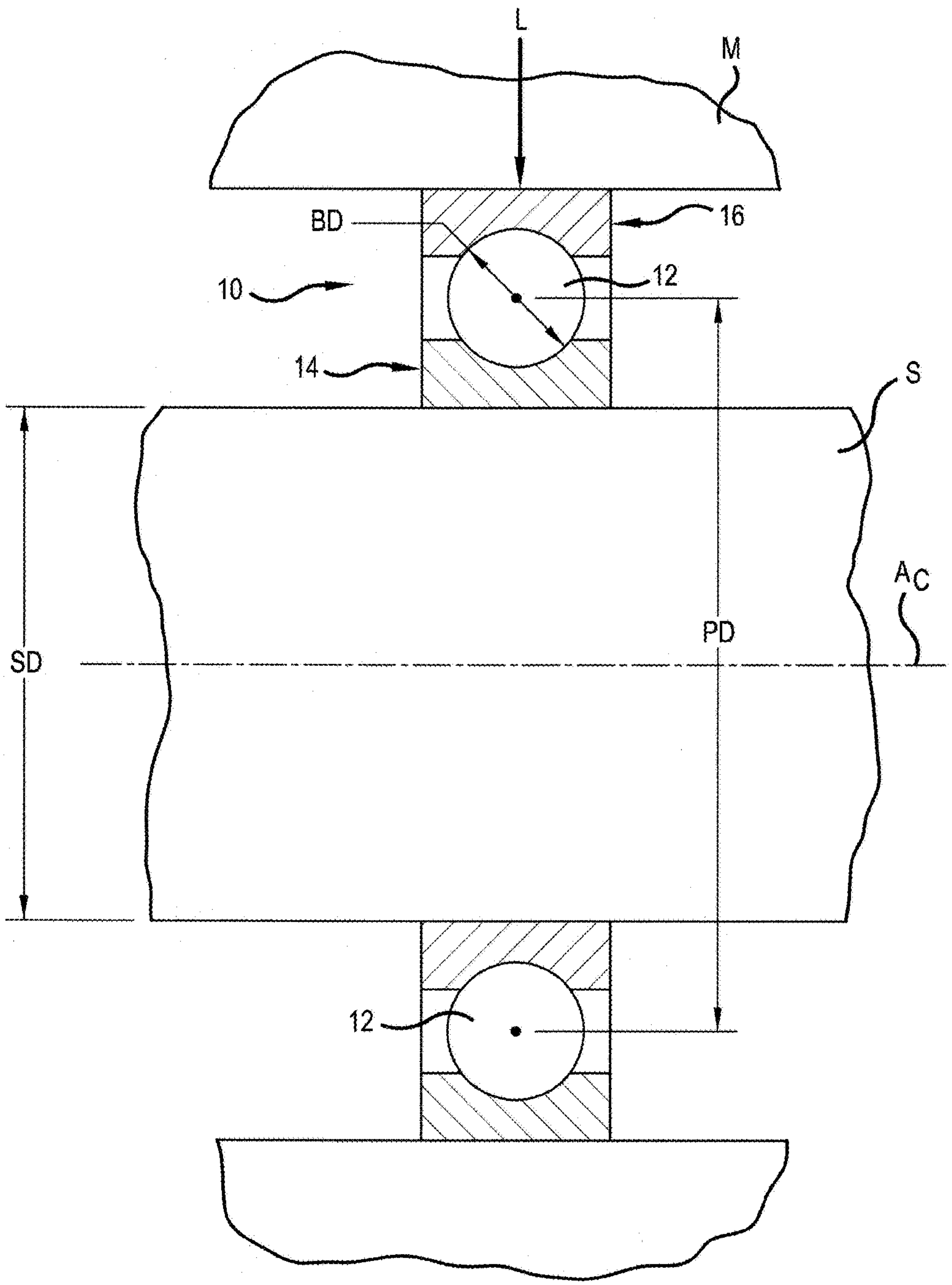
FIG. 1 is an axial cross-sectional view of a ball bearing optimized in accordance with the present invention.
Figure 2:
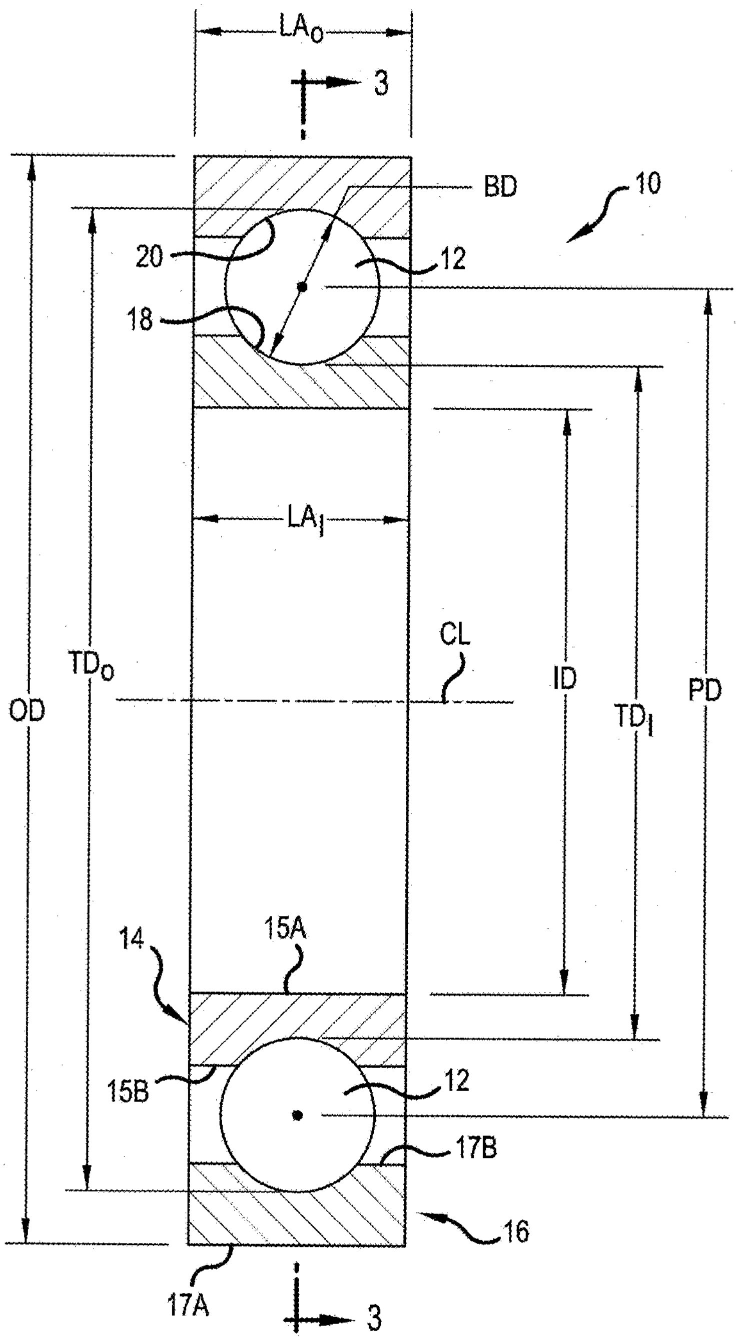
FIG. 2 is an enlarged view of an upper portion of FIG. 1.
Figure 3:
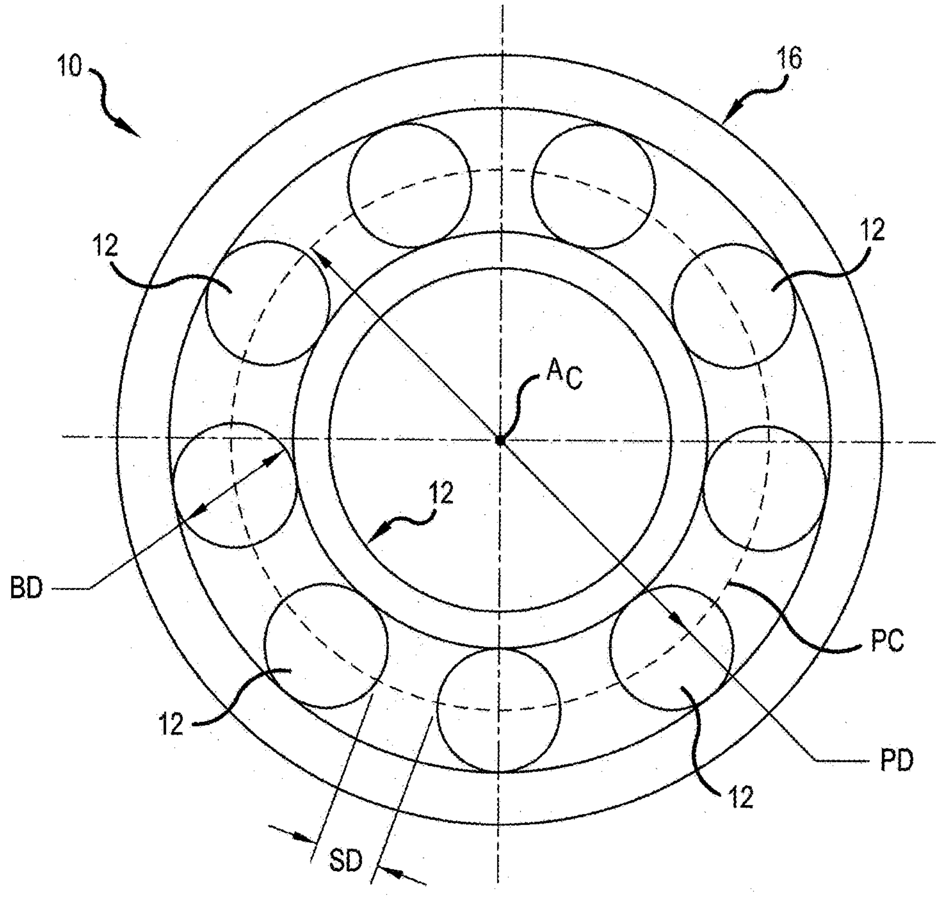
FIG. 3 is a view through line 3-3 of FIG. 2.

Further, the outside diameter OD of the outer ring 16 may have a value of an outside diameter of a commercially available bearing, specifically of such a bearing with an inner ring having inside diameter equal to the determined inner ring inside diameter ID, as shown in FIG. 3. Such an overall sizing of the bearing 10 may be appropriate when a customer has already formed an opening or bore B for the bearing 10 based on conventional bearing design principles. However, the outside diameter OD of the bearing outer ring 16 preferably has a value of less than the outside diameter of the commercially available bearing and greater than a sum of the pitch diameter PD and the ball diameter OD, as shown in FIG. 1. In other words, the outside diameter OD is greater than the value of the outer track diameter $TD_O$ by an appropriate radial thickness between the outer raceway 20 and the outer circumferential surface 17A of the bearing outer ring 16.

The second approach for determining the outer ring outside diameter OD, as described above, takes advantage of a primary benefit of the present invention, which is a reduced overall bearing size due to calculating and implementing a pitch diameter PD which is substantially reduced from the typical pitch diameter of prior art commercial bearings. Not only does such a reduced bearing ring outside diameter OD reduce the weight of the bearing outer ring 16, which is typically formed of a relatively heavy bearing steel, the reduced size enables a corresponding increase of the material of the housing or hub into which the outer ring 16 is installed, which may be formed of a substantially lighter material such as aluminum or even a rigid polymeric material. Further, even if the optimized bearing 10 is installed within an existing bore B or hole sized by a conventional bearing selection process, an annular sleeve SL of a lightweight material (e.g., aluminum) may be provided to fill the space between a reduced size outer ring 16 and the existing bore/hole, as shown in FIG. 5.

However, if the pitch diameter PD determined for the selected ball size (i.e., ball diameter BD) is found unsuitable or invalid by the calculations discussed above, or even when the validated, another standard ball size having another specific ball diameter BD2 may be selected. Preferably, the other ball diameter BD2 is selected from among the plurality of standard ball sizes, but may alternatively be selected or specified with a non-standard ball diameter BD2. Then, the number N2 of the balls 12 of the other ball size required to support the load L is determined and another pitch diameter PD2 of an alternative pitch circle PC2 of the ball bearing 10, based on the determined number N2 of the balls 12 of the other standard ball size, is calculated as described above. Next, another suitability factor X2 may be derived using the following equation:

$$X2=\pi^2*BD2^2*PD2*ID$$

Finally, the other pitch diameter PD2 is validated as suitable for the ball bearing 10 when the other suitability factor X2 has a value between the upper limit UL and the lower limit LL as described above, the limits UL, LL being based solely on the selected inner ring inside diameter ID and is thus the same for all pitch diameters in a particular design application.

The process of selecting a specific ball size and calculating a pitch diameter PD based on the ball diameter BD, the determined inner ring inside diameter ID and the applied load L may be repeated for as many different ball diameters BD (i.e., standard ball sizes) as desired by the particular designer of the ball bearing 10. Then, the ball bearing designer may select one of the specific validated pitch diameters PD, PD2, etc. and the associated ball diameter BD, BD2, etc., and then calculate or select the remaining dimensions of the ball bearing 10 as described above or as known from conventional bearing design factors. The selection of the specific ball diameter and pitch diameter combination may be based upon which design results in the lowest friction as determined by an appropriate simulation tool.

Further, as the design process is preferably iterative for a number of different ball sizes/diameters BD and well as involving various bearing dimensions based upon a calculated pitch diameter PD, the process is preferably automated through the use of an appropriate software program or other computerized means. In other words, a computer software program is preferably provided which is configured to receive the value of the shaft outside diameter ODs and the value of the load L as inputs. The program is configured to perform the steps of selecting the inside diameter ID of the bearing inner ring 14, selecting one standard ball size/diameter BD, determining the number N of the balls 12, calculating the pitch diameter PD, calculating an acceptability factor X and then validating the calculated pitch diameter PD. The software program then provides at least one validated pitch diameter PD as an output, and most preferably provides a plurality of validated pitch diameters PD, PD2, etc. as well as other bearing dimensions corresponding to each validated pitch diameter PD, such as the inner ring inside diameter ID, the bearing axial length LA, a recommended outer ring outside diameter OD, etc. The software program may also determine which combination of the various bearing dimensions results in the least amount of friction.

The bearing design process of the present invention results in a ball bearing 10 that has a reduced pitch diameter PD and which utilizes balls 12 with a smaller ball diameter BD, thus enabling a reduction in both the axial length LA of the bearing 10 and the outside diameter of the bearing 10, i.e., the bearing outer ring outside diameter OD. Such a reduction in overall bearing size reduces the weight of the assembly into which the bearing 10 is installed, and therefore a reduced energy consumption, and typically also leads to reduced friction within the bearing 10 in comparison with a bearing selected for a particular application under previously known bearing selection processes.

Figure 7:
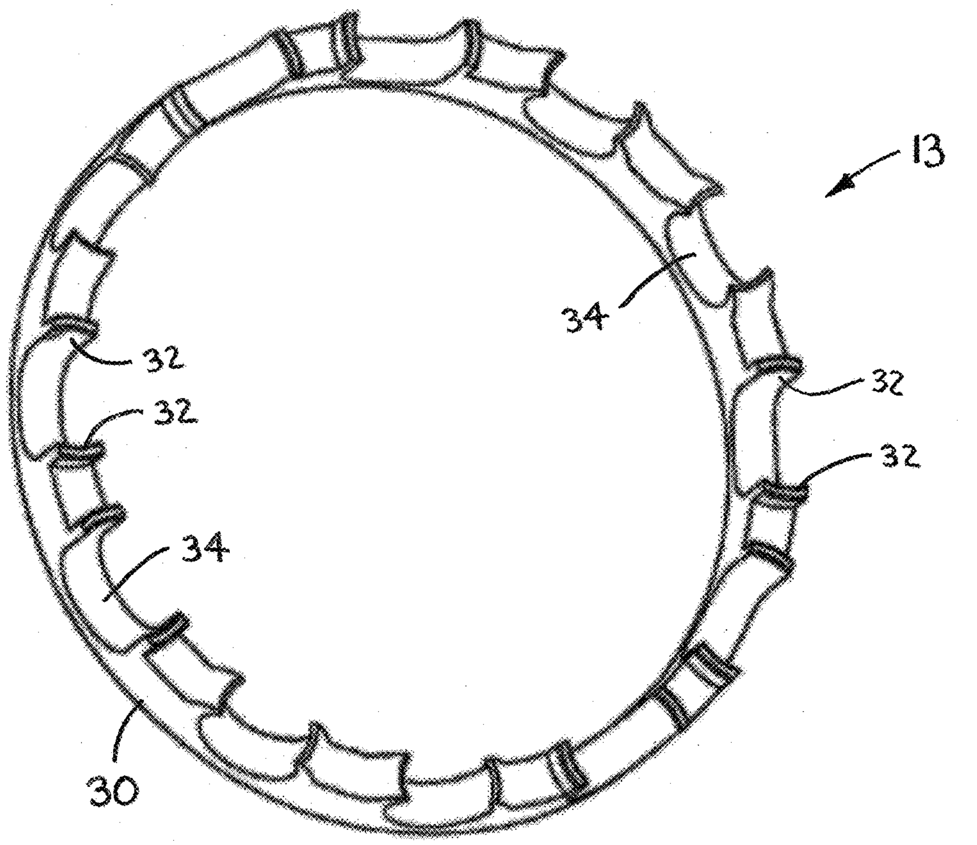
FIG. 7 is a perspective view of a preferred cage for use with the optimized ball bearing.
Figure 8:
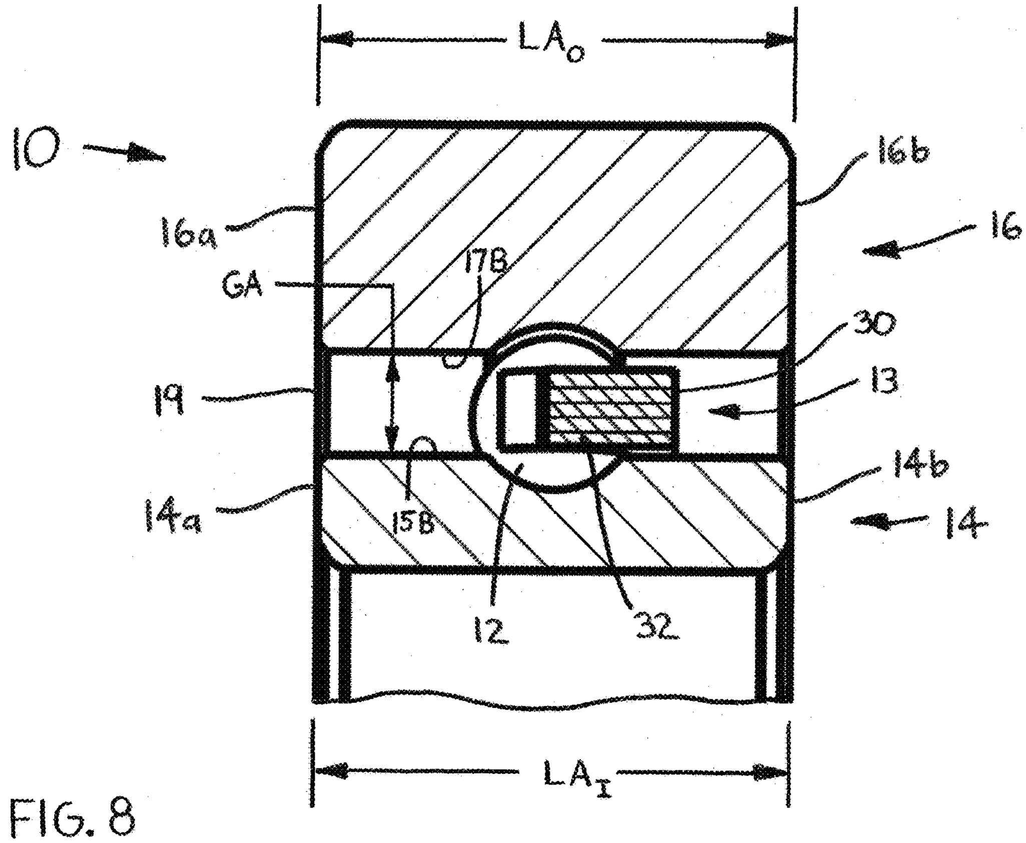
FIG. 8 is a broken-away, axial cross-sectional view of an upper portion of an optimized ball bearing, showing a portion of the preferred cage installed on the balls.

Referring to FIGS. 7 and 8, the bearing cage 13 used with an optimized ball bearing 10 formed in accordance with the present invention is preferably "open-ended" for reasons discussed below. Specifically, the bearing cage 13 preferably includes an annular "backbone" or base 30 and a plurality of arms 32 extending axially from the annular base 30. A plurality of pockets 34 are each defined between a separate pair of adjacent arms 32 and each pocket 34 is configured to retain a separate one of the balls 12. With this cage structure, the annular base or backbone 30 is located on one axial side of the balls 12, i.e., between the balls 12 and one axial end 14*a* or 14*b* of the inner ring 14 and one axial end 16*a* or 16*b* of the outer ring 16. As such, the other axial side of the balls 12 is "open" and allows unobstructed access for lubricant to reach the balls 12, as discussed further below.

Figure 9:
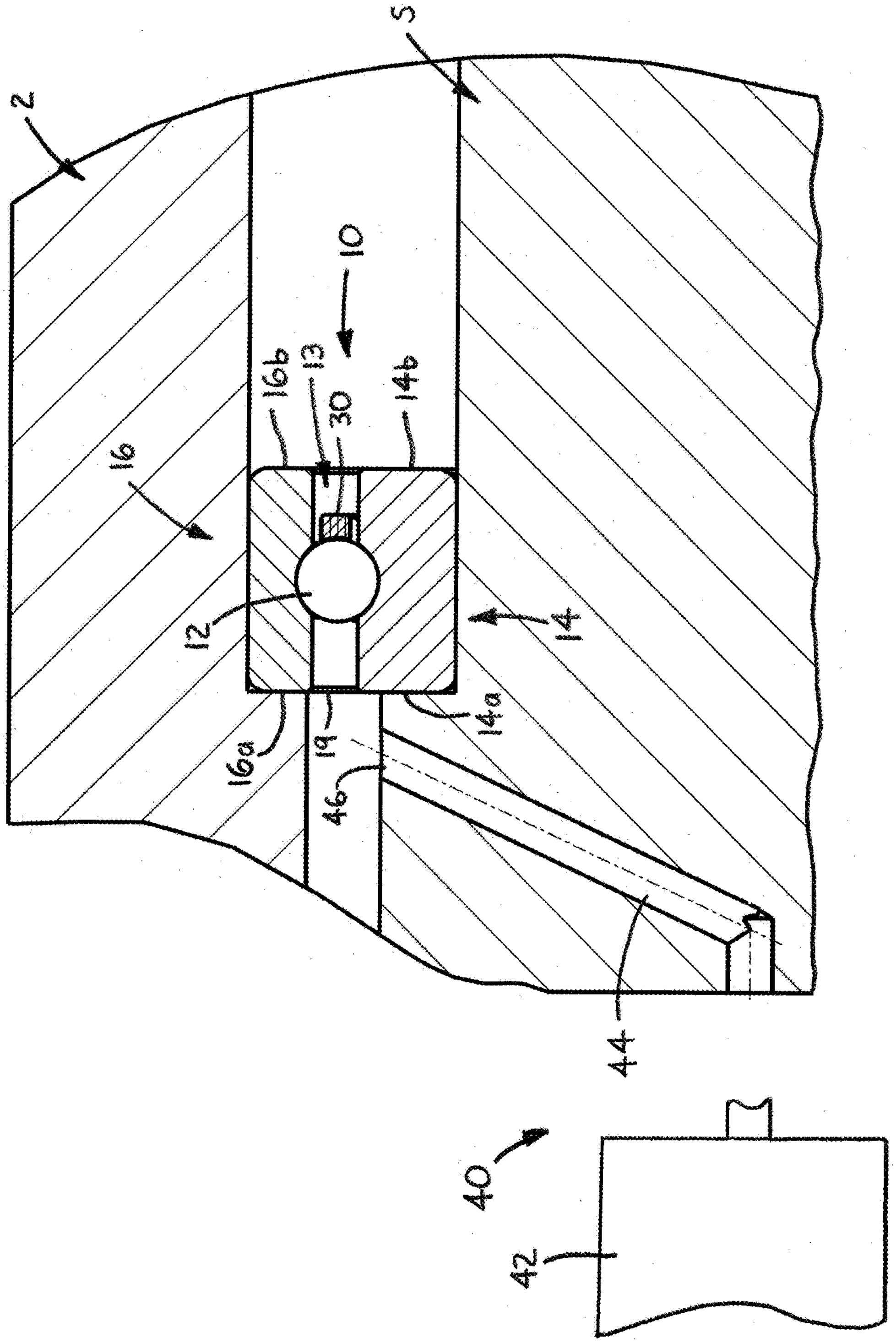
FIG. 9 is a broken-away, axial cross-sectional view of an upper portion of an optimized ball bearing installed about a shaft and within a housing, showing an external lubricant source with a passage through the shaft.
Figure 10:
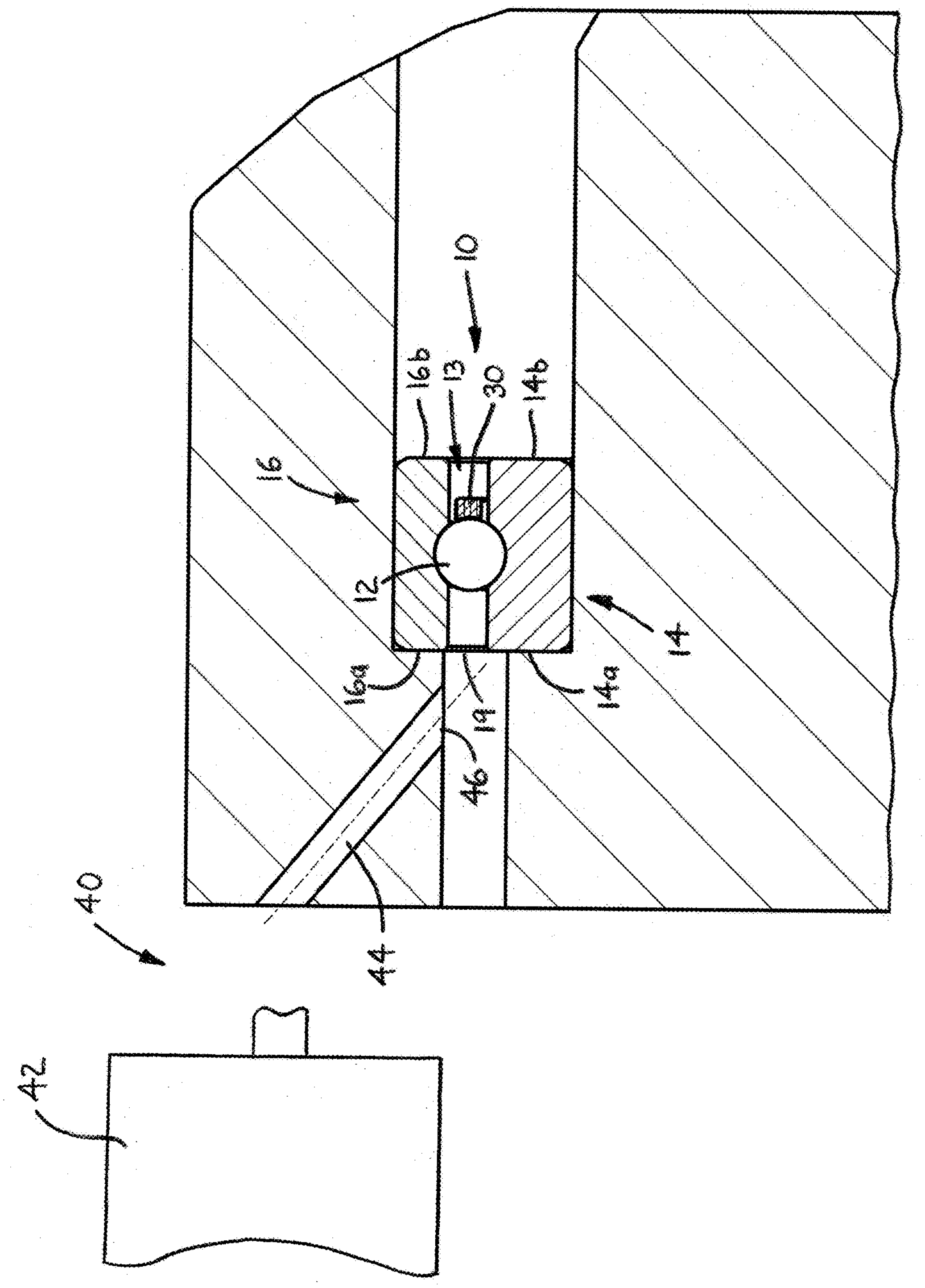
FIG. 10 is a broken-away, axial cross-sectional view of an upper portion of an optimized ball bearing installed about a shaft and within a housing, showing an external lubricant source with a passage through the housing.

As shown in FIGS. 9-10, the optimized ball bearing 10 is preferably used with an external lubricant source 40 configured to direct lubricant into an annular opening 19 defined between the first axial end 14*a* of the inner ring 14 and the first axial end 16*a* of the outer ring 16. The lubricant source 40 preferably includes a reservoir 42 containing a quantity of lubricant and a passage 44 formed in the shaft S, as shown in FIG. 9, or in the housing 2 as depicted in FIG. 10, and having outlet port 46. The outlet port 46 is spaced axially from the first axial ends 14*a*, 16*a* of the inner and outer rings 14, 16 and is configured to direct or discharge lubricant into the annular opening 19, as discussed further below.

Referring specifically to FIG. 10, in certain applications, a particular ball bearing 10 optimized by the process of the present invention results in balls 12 with a ball diameter BD that is relatively small in comparison with the axial length $LA_I$, $LA_O$ of the inner and outer rings 14, 16, respectively. For example, a bearing 10 may be sized such that a ratio of the axial length $LA_I$ of the inner ring 14 to the ball diameter BD (i.e., $LA_I$/BD) is at least 2.0 and may be greater 2.5, and similarly, a ratio of the axial length $LA_O$ of the outer ring 16 to the ball diameter BD (i.e., $LA_O$/BD) is at least 2.0 and may be greater 2.5, the two axial lengths $LA_I$, $LA_O$ preferably being equal. With such a relative sizing between the axial lengths $LA_I$, $LA_O$ of the rings 14, 16 and the ball diameter BD, an annular gap GA between the outer surface 15B of the inner ring 14 and the inner surface 17B of the outer ring 16 is relatively long and narrow, such that a path (not indicated) provided between the rings 14, 16 for lubricant to reach the balls 12 from an external source is relatively constricted.

When the optimized ball bearing 10 results in such a long, narrow annular gap GA, the bearing 10 is preferably used with a cage 13 formed as described above and assembled such that the backbone/base 30 of the cage 13 is positioned on the axial side of the balls 12 opposite to the annular opening 19 into which lubricant is directed. In other words, the lubricant supply 40 is configured to direct lubricant into the annular opening 19 formed between the first axial ends 14*a*, 16*a* of the rings 14, 16 and the cage annular base 30 is disposed axially between the plurality of balls 12 and the second axial ends 14*b*, 16*b* of the inner and outer rings 14, 16. As a result, the structure and positioning of the cage 13 provides an unimpeded path for lubricant to reach the balls 12, therefore improving the lubrication efficiency of the bearing 10.

Referring to FIGS. 11-14, in certain applications, an optimized ball bearing 10 may be result in balls 12 that are sized and positioned, i.e., with a particular ball diameter BD and located at a specific pitch diameter PD, that results in an inner ring 14 or an outer ring 16 sized to accommodate the ball size and pitch diameter PD having a radial thickness $TR_I$ or $TR_O$, respectively, that is relatively large in comparison with the ball diameter BD. For example, a specific bearing 10 may be sized such that a ratio of the radial thickness $TR_I$ of the inner ring 14 to the ball diameter BD (i.e., $TR_I$/BD) is at least 1.0 or a ratio of the radial thickness $TR_O$ of the outer ring 16 to the ball diameter BD (i.e., $TR_O$/BD) is at least 1.0. Such a relatively "thick" inner ring 14 or outer ring 16 may result in a ring mass that is greater than desired, resulting undesired dynamic conditions, for example, increased rotational inertia.

To reduce such adverse effects of a "massive" inner ring 14 or outer ring 16, at least the one ring 14 or 16 having a ratio of the ring radial thickness $TR_I$, $TR_O$ to the ball diameter BD of at least 1.0 is preferably provided with at least one annular recessed surface 50 to reduce the mass of the particular ring 14 or 16. Specifically, when provided on the inner ring 14, the recessed surface 50 is formed between the outer circumferential surface 15B of the inner ring 14 and at least one of the first axial end 14*a* and/or the second axial end 14*b* of the ring 14 and extends circumferentially entirely about the centerline CL. Alternatively or additionally, an annular recessed surface 50 may be formed on the outer ring 16 between the inner circumferential surface 17B of the outer ring 16 and at least one of the first axial end 16*a* and/or the second axial end 16*b* of the ring 16. The recessed surface(s) 50 may be formed during a forging process used to produce the bearing rings 14, 16 or may be machined in the rings 14, 16 when the bearing material is in a relatively "soft" state.

Figure 11:
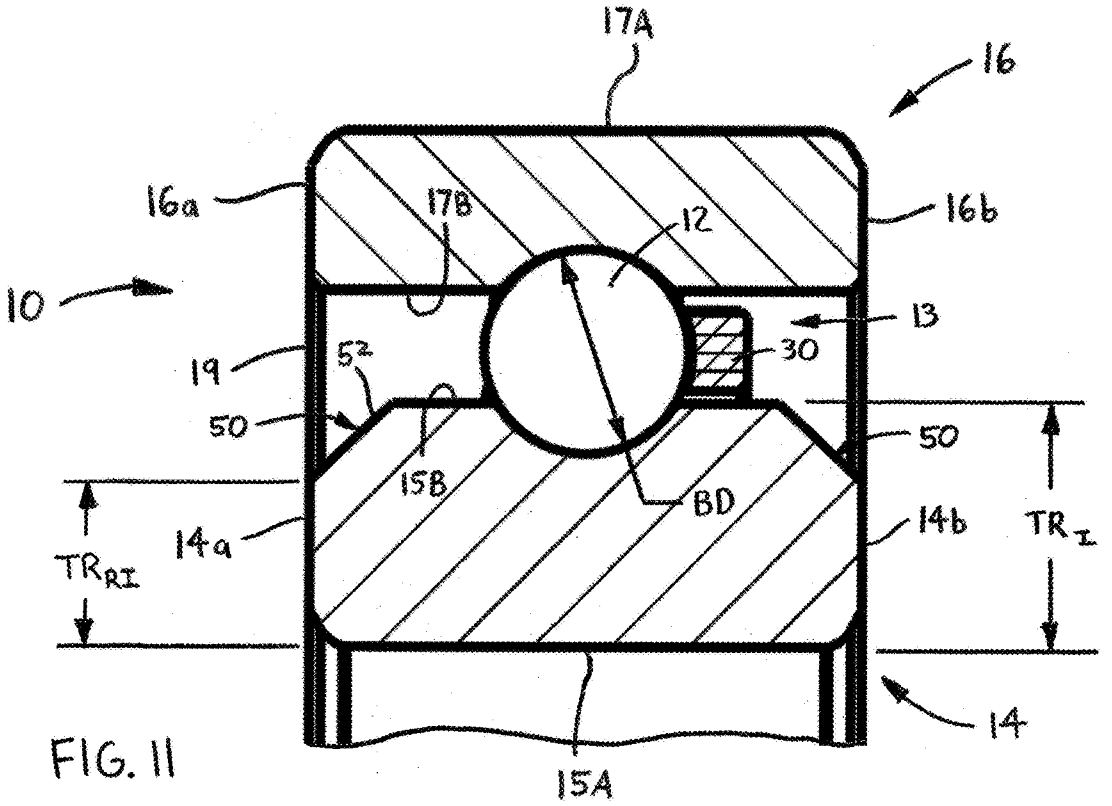
FIG. 11 is a broken-away, axial cross-sectional view of an upper portion of an optimized ball bearing having an inner ring with a relatively large radial thickness, shown with annular recessed surfaces formed as chamfers.
Figure 12:
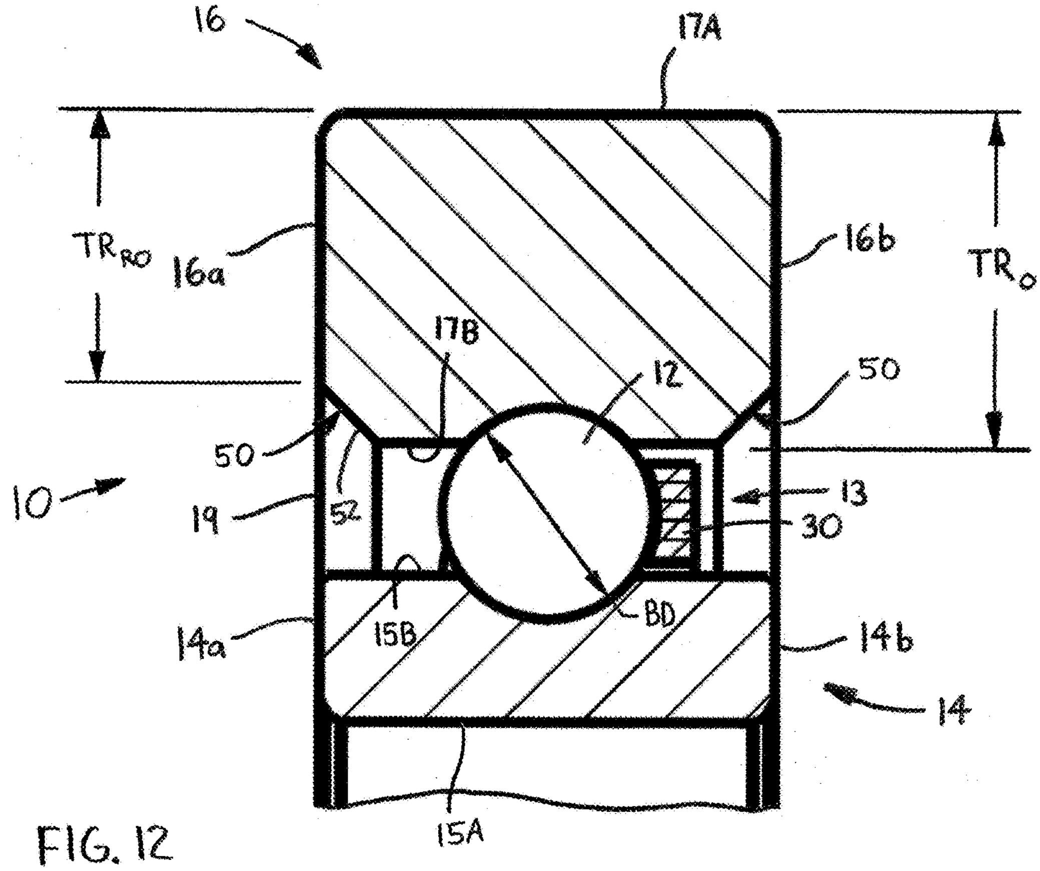
FIG. 12 is a broken-away, axial cross-sectional view of an upper portion of an optimized ball bearing having an outer ring with a relatively large radial thickness, shown with annular recessed surfaces formed as chamfers.
Figure 13:
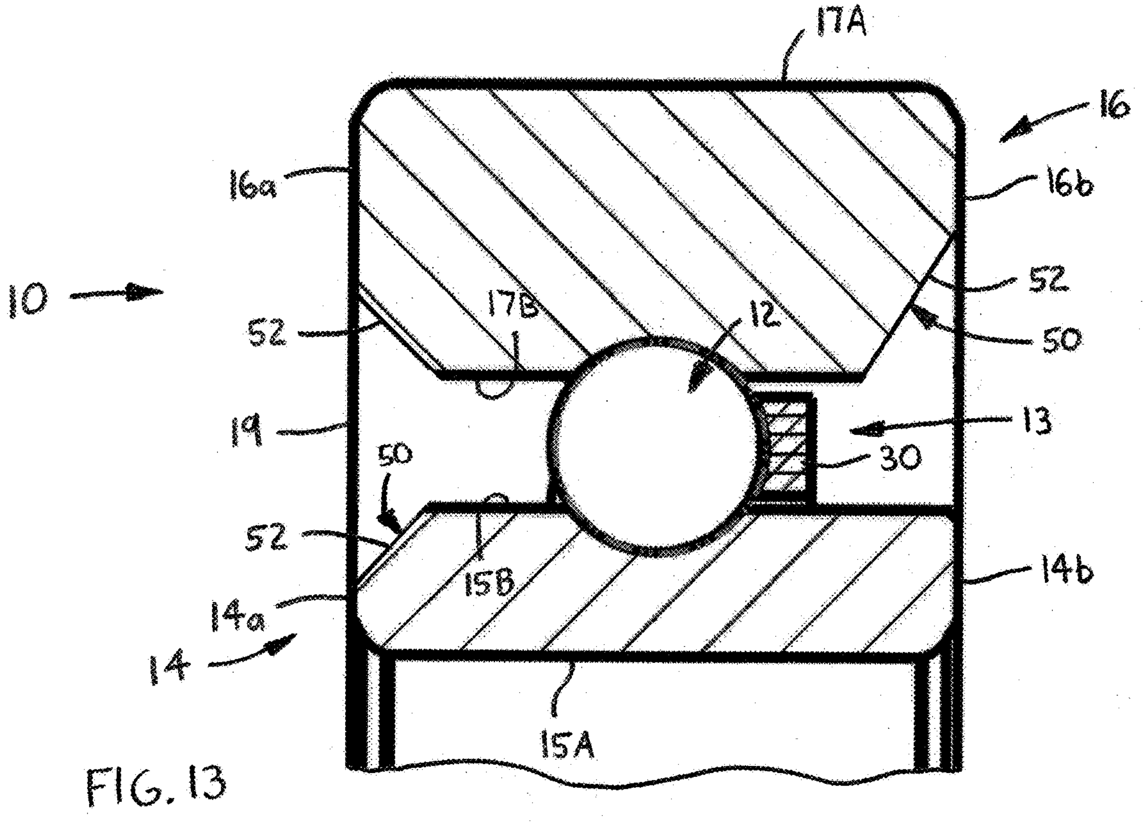
FIG. 13 is a broken-away, axial cross-sectional view of an upper portion of an optimized ball bearing having an outer ring with a relatively large radial thickness, shown with the outer ring having asymmetric chamfers and the inner ring having a single chamfer.

Referring particularly to FIGS. 11 and 12, by providing the annular recessed surface(s) 50 to decrease the mass of either or both of the rings 14, 16, each ring 14, 16 with at least one recessed surface 50 has a reduced radial thickness $TR_{RI}$ or $TR_{RO}$ at each axial end 14*a*, 14*b* and/or 16*a*, 16*b* adjacent to the recessed surface 50, i.e., the axial end 14*a*, 14*b*, 16*a* or 16*b* from which extends a recessed surface 50. Preferably, the reduced radial thickness $TR_{RI}$, $TR_{RO}$ has a value of less than eighty percent of a value of the radial thickness $TR_I$, $TR_O$ of the remainder of the ring 14, 16 on which the surface 50 is formed. Most preferably, each reduced radial thickness $TR_{RI}$, $TR_{RO}$ has a value substantially less than the value of the ring radial thickness $TR_I$, $TR_O$, such as less than seventy percent, less than fifty percent, etc. As such, it is clear that the recessed surfaces 50 provided in accordance with the present invention result in the removal of a substantially greater amount of material in comparison to a chamfer or radius provided on a typical bearing ring for the purpose of removing sharp edges or to facilitate installation of the bearing.

Figure 14:
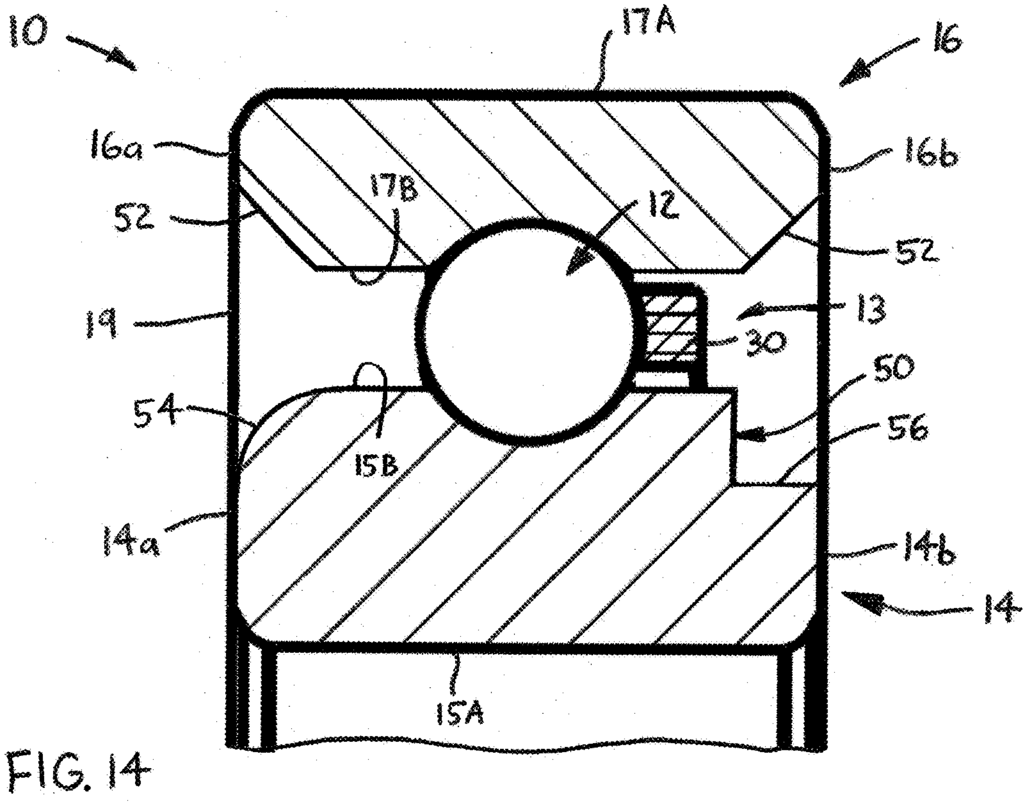
FIG. 14 is a broken-away, axial cross-sectional view of an upper portion of an optimized ball bearing having an inner ring with a relatively large radial thickness, shown with the inner ring having a fillet and a groove and the outer ring having symmetric chamfers.

Further, each annular recessed surface 50 may be formed as a chamfer 52 (FIGS. 11-14), as a filet 54 (FIG. 14), as an open groove 54 (FIG. 14, shown as a rectangular step), or in any other appropriate manner that reduces the amount of material of the ring 14 and/or 16, and thereby also reduces the mass thereof, such as for example, a complex-shaped surface including a combination of one or more flat surfaces and/or one or more curved surfaces. The recessed surfaces 50 may be formed symmetrically (FIGS. 11 and 12) or asymmetrically (FIGS. 13 and 14) on each ring 14 and/16 that is provided with such surfaces 50. Also, as the annular recessed surfaces 50 also increase the size or width of the annular opening 19 for receiving lubricant, the recessed surfaces 50 may be provided on the first axial ends 14*a*, 16*a* of both rings 14, 16 (and even also on the second axial ends 14*b*, 16*b*) in order to improve the flow of lubricant to the balls 12 and thereafter out of the bearing 10.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A ball bearing for an electric vehicle, the ball bearing supporting a load applied to a shaft of an electric motor of the vehicle, the ball bearing comprising:

an inner ring having a centerline, an inner circumferential surface sized to fit upon the shaft of the electric motor, an outer circumferential surface, a radial thickness defined between the inner and outer circumferential surfaces, a first axial end, an opposing second axial end, and an inner raceway formed in the outer circumferential surface;

an outer ring disposed about the inner ring and having an outer circumferential surface, an inner circumferential surface, a radial thickness defined between the inner and outer circumferential surfaces, a first axial end, an opposing second axial end and an outer raceway formed in the inner circumferential surface;

a lubricant source configured to direct lubricant into an annular opening defined between the first axial end of the inner ring and the first axial end of the outer ring and including a passage formed in the shaft or in a housing and connected a lubricant reservoir, the passage having an outlet port spaced axially from first axial ends of the inner and outer rings and configured to direct lubricant into the annular opening between the inner and outer rings;

a bearing cage including an annular base, a plurality of arms extending axially from the annular base and a plurality of pockets each defined between a separate pair of adjacent arms, each pocket retaining a separate one of the balls, the annular base of the cage being disposed axially between the plurality of balls and the second axial ends of the inner and outer ring; and a plurality of balls disposed between the inner raceway and the outer raceway, each ball having a ball diameter;

wherein one of:

a ratio between the radial thickness of the inner ring and the ball diameter is at least 1.0 and the inner ring includes at least one annular recessed surface formed between the outer circumferential surface and the first axial end and/or formed between the outer circumferential surface and the second axial end; and a ratio between the radial thickness of the outer ring and the ball diameter is at least 1.0 and the outer ring includes at least one annular recessed surface formed between the inner circumferential surface and the first axial end and/or formed between the inner circumferential surface and the second axial end.

2. The ball bearing as recited in claim 1, wherein each one of the inner and outer rings with the at least one annular recessed surface has a reduced radial thickness at each one of the first and second axial ends adjacent to the annular recessed surface, the reduced radial thickness having a value of less than eighty percent of a value of the radial thickness of a remainder of the inner ring or the outer ring.

3. The ball bearing as recited in claim 1, wherein:

an inner ring has an inside diameter, the inside diameter being sized such that the inner ring fits upon the shaft of the electric motor;

the plurality of balls traverse a pitch circle extending about the centerline, the pitch circle having a pitch diameter; and a number of the plurality of balls and the ball diameter are selected to provide a value of the pitch diameter which satisfies the following equations:

$$X = \pi^2 * BD^2 * PD * ID;\ \text{where } LL \le X \le UL;$$

$$UL = (-2.4815 * ID^3) + (211.6 * ID^2) - (4568.1 * ID) + 38956;\ \text{and}$$

$$LL = (-23.511 * ID^2) + (2235.9 * ID) - 2856;$$

wherein X is a suitability factor, BD is the ball diameter, PD is the pitch diameter, ID is the inside diameter of the inner ring, LL is a lower limit and UL is an upper limit.

4. The ball bearing as recited in claim 3, wherein:

each ball is formed of ceramic and the value of the ball diameter is between three millimeters and six millimeters; and the inside diameter of the inner ring has a value between twenty millimeters and sixty millimeters.

5. The ball bearing as recited in claim 3, wherein:

the number of the balls is determined by dividing the value of the load by the load capacity of each ball having the ball diameter;

the circumference of the pitch circle is determined by multiplying the number of the balls by the ball diameter; and the pitch diameter is determined by dividing the circumference of the pitch circle by the value of x.

6. The ball bearing as recited in claim 1, wherein at least one of:

the inner ring has a first annular recessed surface formed between the outer circumferential surface and the first axial end and a second annular recessed surface formed between the outer circumferential surface and the second axial end; and the outer ring has a first annular recessed surface formed between the inner circumferential surface and the first axial end and a second annular recessed surface formed between the inner circumferential surface and the second axial end.

7. The ball bearing as recited in claim 1, wherein each annular recessed surface is one of a chamfer, a fillet and a groove.

8. The ball bearing as recited in claim 1, wherein:

the inner ring has an axial length defined between the first and second axial ends of the inner ring, the inner ring being sized such that a ratio of the axial length of the inner ring and the ball diameter is at least 2.0; and the outer ring has an axial length defined between the first and second axial ends of the outer ring, the outer ring being sized such that a ratio of the axial length of the outer ring and the ball diameter is at least 2.0.

9. A ball bearing for an electric vehicle, the ball bearing supporting a load applied to a shaft of an electric motor of the vehicle, the ball bearing comprising:

an inner ring having a centerline, an inner circumferential surface having an inside diameter sized to fit upon the shaft of the electric motor, an outer circumferential surface, a radial thickness defined between the inner and outer circumferential surfaces, a first axial end, an opposing second axial end, and an inner raceway formed in the outer circumferential surface;

an outer ring disposed about the inner ring and having an outer circumferential surface, an inner circumferential surface, a radial thickness defined between the inner and outer circumferential surfaces, a first axial end, an opposing second axial end and an outer raceway formed in the inner circumferential surface; and a plurality of balls disposed between the inner raceway and the outer raceway, each ball having a ball diameter and the plurality of balls traversing a pitch circle extending about the centerline, the pitch circle having a pitch diameter;

wherein one of:

a ratio between the radial thickness of the inner ring and the ball diameter is at least 1.0 and the inner ring includes at least one annular recessed surface formed between the outer circumferential surface and the first axial end and/or formed between the outer circumferential surface and the second axial end; and a ratio between the radial thickness of the outer ring and the ball diameter is at least 1.0 and the outer ring includes at least one annular recessed surface formed between the inner circumferential surface and the first axial end and/or formed between the inner circumferential surface and the second axial end; and wherein a number of the plurality of balls and the ball diameter are selected to provide a value of the pitch diameter which satisfies the following equations:

$$X = \pi^2 * BD^2 * PD * ID;\ \text{where } LL \le X \le UL;$$

$$UL = (-2.4815 * ID^3) + (211.6 * ID^2) - (4568.1 * ID) + 38956;\ \text{and}$$

$$LL = (-23.511 * ID^2) + (2235.9 * ID) - 2856;$$

wherein X is a suitability factor, BD is the ball diameter, PD is the pitch diameter, ID is the inside diameter of the inner ring, LL is a lower limit and UL is an upper limit.

10. The ball bearing as recited in claim 9, wherein each one of the inner and outer rings with at least one annular recessed surface has a reduced radial thickness at each one of the first and second axial ends adjacent to the annular recessed surface, the reduced radial thickness having a value of less than eighty percent of a value of the radial thickness of a remainder of the inner ring or the outer ring.

11. The ball bearing as recited in claim 9, wherein:

each ball is formed of ceramic and the value of the ball diameter is between three millimeters and six millimeters; and the inside diameter of the inner ring has a value between twenty millimeters and sixty millimeters.

12. The ball bearing as recited in claim 9, wherein:

the number of the balls is determined by dividing the value of the load by the load capacity of each ball having the ball diameter;

the circumference of the pitch circle is determined by multiplying the number of the balls by the ball diameter; and the pitch diameter is determined by dividing the circumference of the pitch circle by the value of x.

13. The ball bearing as recited in claim 9, wherein:

the inner ring has a first annular recessed surface formed between the outer circumferential surface and the first axial end and a second annular recessed surface formed between the outer circumferential surface and the second axial end; and/or the outer ring has a first annular recessed surface formed between the inner circumferential surface and the first axial end and a second annular recessed surface formed between the inner circumferential surface and the second axial end.

14. The ball bearing as recited in claim 9, wherein each annular recessed surface is one of a chamfer, a fillet and a groove.

15. The ball bearing as recited in claim 9, wherein:

the inner ring has an axial length defined between the first and second axial ends of the inner ring, the inner ring being sized such that a ratio of the axial length of the inner ring and the ball diameter is at least 2.0; and the outer ring has an axial length defined between the first and second axial ends of the outer ring, the outer ring being sized such that a ratio of the axial length of the outer ring and the ball diameter is at least 2.0.

16. The ball bearing as recited in claim 9, further comprising:

a lubricant source configured to direct lubricant into an annular opening defined between the first axial end of the inner ring and the first axial end of the outer ring; and a bearing cage including an annular base, a plurality of arms extending axially from the annular base and a plurality of pockets each defined between a separate pair of adjacent arms, each pocket retaining a separate one of the balls, the annular base of the cage being disposed axially between the plurality of balls and the second axial ends of the inner and outer rings.

17. The ball bearing as recited in claim 16, wherein the lubricant source includes a passage formed in the shaft or in a housing and connected a lubricant reservoir, the passage having an outlet port spaced axially from first axial ends of the inner and outer rings and configured to direct lubricant into the annular opening between the inner and outer rings.

* * * * *